No. 769,926. PATENTED SEPT. 13, 1904.
R. R. WILLIAMS.
CAR STOPPER.
APPLICATION FILED JAN. 18, 1904.
NO MODEL.
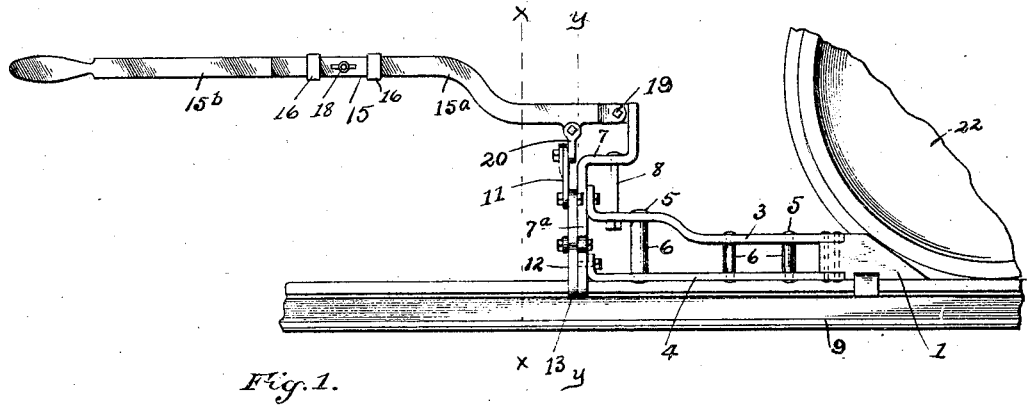
Fig. 1.
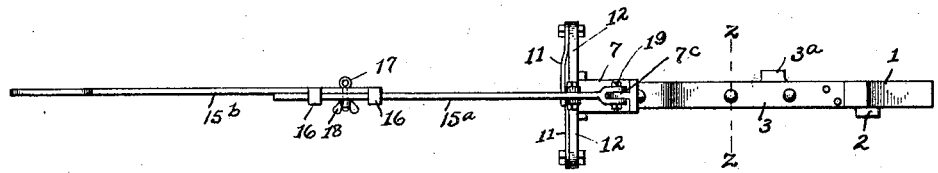
Fig. 2.
Fig. 3.
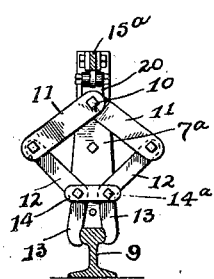
Fig. 5.
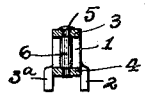
Fig. 4.
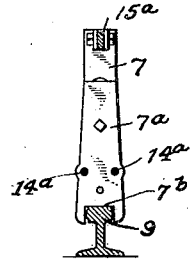
WITNESSES:
H. B. Bradshaw
A. L. Phelps
INVENTOR
Robert R. Williams
BY
Shepherd and Parker
ATTORNEYS.

No. 769,926. Patented September 13, 1904.

UNITED STATES PATENT OFFICE.

ROBERT R. WILLIAMS, OF NELSONVILLE, OHIO.

CAR-STOPPER.

SPECIFICATION forming part of Letters Patent No. 769,926, dated September 13, 1904.

Application filed January 18, 1904. Serial No. 189,391. (No model.)

*To all whom it may concern:*

Be it known that I, ROBERT R. WILLIAMS, a citizen of the United States, residing at Nelsonville, in the county of Athens and State of Ohio, have invented a certain new and useful Improvement in Car-Stoppers, of which the following is a specification.

My invention relates to the improvement of car stopping or blocking devices of that class which are adapted to hold a car upon a track against voluntary movement; and the objects of my invention are to provide a car stopping and holding device of this class of superior construction and arrangement of parts, to so construct the same as to facilitate its being readily clamped in connection with a track-rail and firmly held against displacement, and to produce certain improvements in details of construction, which will be more fully pointed out hereinafter. These objects I accomplish in the manner illustrated in the accompanying drawings, in which—

Figure 1 is a side elevation of my improved car-stopping device, showing the same in connection with a track-rail and in contact with a portion of the car-wheel. Fig. 2 is a plan view of the device. Fig. 3 is a sectional view on line $x$ $x$ of Fig. 1. Fig. 4 is a sectional view on line $y$ $y$ of Fig. 1, and Fig. 5 is a sectional view on line $z$ $z$ of Fig. 2.

Similar numerals refer to similar parts throughout the several views.

In carrying out my invention I employ a car-wheel contact-block 1, the outer end of which is preferably inclined, as shown, said block being provided with a laterally-projecting and downwardly-extending lug 2. As indicated in the drawings, the rear end of the block 1 is embraced by and secured to the outer or forward ends of upper and lower rearwardly-extending bars 3 and 4, these bars being connected at suitable intervals with bolts 5, which may be reinforced by tubular casings 6. The rear end portions of the bars 3 are preferably turned upward, said upturned ends being bolted to the rear face of the downwardly-extending member $7^a$ of a vertically-disposed angular bar or standard 7, this bar having its upper portion bent forwardly and thence upwardly, as indicated, the forwardly-bent portion being connected with the upper bar 3 by a bolt 8. The lower end of the bar or standard 7 is, as shown more clearly at $7^b$ in Fig. 4 of the drawings, bifurcated, the yoke-like termination thus produced being adapted to embrace the tread of the track-rail, such as is indicated at 9.

To the outer or rear face and upper portion of the bar member $7^a$ are pivoted at 10 the upper ends of outwardly-extending toggle-arms 11, the remaining ends of which are pivotally connected with inwardly and downwardly inclined toggle-arms 12, the latter terminating in downwardly-extending clamping members 13, which, as shown, may be of a partial hook form and adapted to embrace opposite sides of the tread of a track-rail. At the junctions of the clamp terminations 13 and the bars or arms 12 said arms are pivotally connected with a short transverse connecting-bar 14, the pivotal bolts $14^a$ of which pass through the standard member $7^a$.

15 represents an operating-lever which, as indicated in the drawings, is preferably formed of inner and outer sections $15^a$ and $15^b$, one end of the section $15^a$ being slidably connected with the section $15^b$ by passing through keeper-lugs 16, formed on said section $15^b$. This connection of said lever members is made adjustable through the medium of a suitable form of bolt 17, provided with a clamping-nut 18. The inner end portion of the lever thus formed is preferably provided with an angular bend, as indicated in the drawings, and the member or section $15^a$ is hinged or pivotally connected, as indicated at 19, to a rearwardly-projecting lug $7^c$ of the upper end portion of the bar or standard 7. At a point in rear or on the outer side of this connection with said standard the lever member $15^a$ has connected with its under side a short depending arm 20, which is pivotally connected with the upper and inner ends of the toggle-bars 11.

The bar 3 is provided, as indicated at 21, with a laterally and downwardly projecting lug $3^a$, which is designed to engage the opposite side of the track-rail from that engaged by the lug 2 of the block 1.

In utilizing my device for stopping or blocking the wheel of a car on a track the block 1, together with the lower bar 4, is supported longitudinally upon the tread of the track-rail 9, and said tread is embraced within the bifurcation at the lower end of the standard 7. The lever 15 being in the elevated position, it will be understood that the clamping-jaws 13 will be free to pass downward on opposite sides of the track-rail and when said lever is moved downward to the horizontal position (shown in Fig. 1 of the drawings) it will be understood that the downward movement of the toggle-arms 11 will result, through their connection with the arms 12, in the jaws 13 firmly gripping the tread of the track-rail on opposite sides, as indicated in Fig. 3. In this manner the stop-block 1 and its supporting-framework is locked in connection with the track-rail, so that the car-wheel, a portion of one of which is indicated at 22, will abut against the inclined face of said block and prevent further movement of the wheel.

It will be understood that a device of this character will be of great utility in retaining a car in its proper position on scales or at an unloading-point, the same being particularly useful where the track-rails upon which the car-wheels rest are more or less inclined.

Having now fully described my invention, what I claim, and desire to secure by Letters Patent, is—

1. In a car-stopping attachment for track-rails, the combination with a stop-block adapted to rest upon a rail, a rearwardly-extending framework connected with said block, said framework comprising a terminal standard, of a lever pivoted to said standard, a pair of bars 12 having opposing gripper-jaws and connections between said bars and said lever whereby the movement of the latter causes said jaws to move toward each other.

2. In a car-stopping attachment for track-rails, the combination with a stop-block 1 adapted to rest upon the tread of a track-rail, and a frame connected with said block and having a terminal standard, said standard having its lower end bifurcated and adapted to embrace the tread of a track-rail, of a pair of pivoted clamping-jaws, an operating-lever having a pivotal connection with said frame-standard and a toggle-joint connection between said clamping-jaws and lever.

ROBERT R. WILLIAMS.

In presence of—
 FRED DILCHER,
 JOHN RIDER.